United States Patent
Heil

(10) Patent No.: US 10,785,702 B2
(45) Date of Patent: Sep. 22, 2020

(54) BEACON AND METHOD FOR SETTING UP AND FOR MAINTAINING A NETWORK

(71) Applicant: M-Way Solutions GmbH, Stuttgart (DE)

(72) Inventor: Marius Heil, Stuttgart (DE)

(73) Assignee: M-Way Solutions GmbH (DE)

( * ) Notice: Subject to any disclaimer, the term of this patent is extended or adjusted under 35 U.S.C. 154(b) by 0 days.

(21) Appl. No.: 15/742,911

(22) PCT Filed: Jul. 13, 2016

(86) PCT No.: PCT/EP2016/066605
§ 371 (c)(1),
(2) Date: Jan. 9, 2018

(87) PCT Pub. No.: WO2017/009366
PCT Pub. Date: Jan. 19, 2017

(65) Prior Publication Data
US 2018/0220354 A1    Aug. 2, 2018

(30) Foreign Application Priority Data
Jul. 14, 2015 (DE) .................. 10 2015 111 405

(51) Int. Cl.
*H04W 40/32* (2009.01)
*H04W 8/00* (2009.01)
(Continued)

(52) U.S. Cl.
CPC ............ *H04W 40/32* (2013.01); *H04W 4/80* (2018.02); *H04W 8/005* (2013.01); *H04W 24/02* (2013.01);
(Continued)

(58) Field of Classification Search
CPC .................................................. H04W 40/32
See application file for complete search history.

(56) References Cited

U.S. PATENT DOCUMENTS 9,282,582 B1 *  3/2016 Dunsbergen .......... H04W 48/12
9,820,135 B2 * 11/2017 Wang .................... H04W 4/80
(Continued)

FOREIGN PATENT DOCUMENTS

DE      102012205355 A1   10/2013
WO      2015054501 A2      4/2015

OTHER PUBLICATIONS

International Search Report dated Sep. 14, 2016, in corresponding PCT/EP2016/066605 (9 pages)(not prior art).
(Continued)

*Primary Examiner* — Jason E Mattis
(74) *Attorney, Agent, or Firm* — Lucian Wayne Beavers; Gary L. Montle; Patterson Intellectual Property Law, PC

(57) ABSTRACT

The invention relates to a method for establishing and maintaining a network having two or more subscribers, based on radio connections between the subscribers in accordance with a Bluetooth Low Energy (BLE) standard, each subscriber being uniquely characterized by way of a subscriber identifier (node ID). Provision is made in that context that clusters having one subscriber, or several subscribers connected by means of BLE network connections, are formed; that a unique cluster identifier (cluster ID) is allocated to each cluster; that a first subscriber of a first cluster selects a second subscriber, located within range of a BLE connection, from a second cluster that is smaller or of the same size, and causes it to be detached from the second cluster and integrated into the first cluster by way of a BLE network connection to the first subscriber. The invention further relates to a beacon for carrying out the method.

12 Claims, 4 Drawing Sheets

Figure 1:
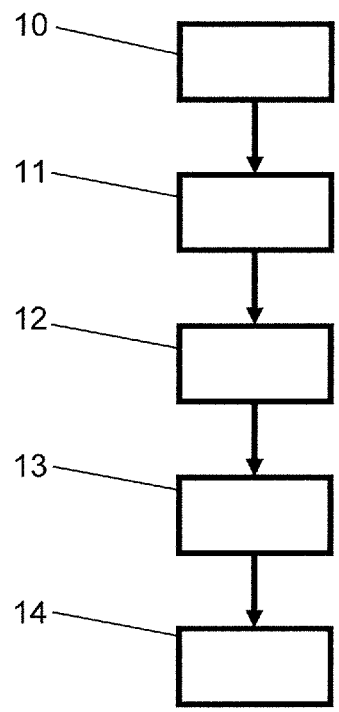

(51) Int. Cl.
  *H04W 24/02* (2009.01)
  *H04W 84/14* (2009.01)
  *H04W 4/80* (2018.01)
  *H04W 40/24* (2009.01)
  *H04W 84/20* (2009.01)

(52) U.S. Cl.
  CPC ........... *H04W 40/24* (2013.01); *H04W 84/14* (2013.01); *H04W 84/20* (2013.01)

(56) References Cited

U.S. PATENT DOCUMENTS

| | | | |
|---|---|---|---|
| 2002/0103893 A1 | 8/2002 | Frelechoux et al. | |
| 2007/0280137 A1 | 12/2007 | Bahr et al. | |
| 2013/0003630 A1 | 1/2013 | Xhafa et al. | |
| 2013/0170336 A1* | 7/2013 | Chen | H04L 12/44 370/221 |
| 2015/0006633 A1* | 1/2015 | Vandwalle | H04L 67/1051 709/204 |
| 2015/0043559 A1 | 2/2015 | Eichler | |
| 2016/0381538 A1* | 12/2016 | Tan | H04W 4/90 455/404.2 |

OTHER PUBLICATIONS

International Search Report dated Nov. 29, 2016, in corresponding PCT/EP2016/066605 (18 pages)(not prior art).
English translation of ISR dated Nov. 29, 2016, in corresponding PCT/EP2016/066605 (3 pages)(not prior art).
Specification of the Bluetooth System, Specification vol. 6, Jun. 30, 2010, retrieved on Jan. 12, 2012 from the Internet: URL: www.bluetooth.com, (136 pages).
"Multi-connectivity strategy for agile service delivery with low power discovery", Article by Lee Taeyoung et al. for the 2014 IEEE 25th Annual International Symposium on personal, indoor, and mobile radio communication Sep. 2, 2014 (6 pages).
"Energy Analysis of Device Discovery for Bluetooth Low Energy", Article by Liu Jia et al. for Sep. 2, 2013, for the 2013 IEEE 78th Vehicular Technology Conference (6 pages).
European Search Report for corresponding application No. EP 16 742 205.4, dated Feb. 5, 2019, 8 pages (not prior art).

* cited by examiner

BEACON AND METHOD FOR SETTING UP AND FOR MAINTAINING A NETWORK

The invention relates to a method for establishing and maintaining a network having two or more subscribers, based on radio connections between the subscribers in accordance with a Bluetooth Low Energy (BLE) standard, each subscriber being uniquely characterized by way of a subscriber identifier (node ID).

The invention further relates to a beacon, in particular a battery- or rechargeable battery-operated beacon, having a microprocessor and a radio interface, the radio interface being designed to establish, in accordance with a Bluetooth Low Energy (BLE) standard, a data connection to a further subscriber having such an interface, the beacon being designed to send out connection data and to search for transmitted connection data of further subscribers.

Bluetooth Low Energy (Bluetooth LE or BLE) creates a standard for radio-based data transfer between electronic devices in which low energy consumption is particularly emphasized. It is thus suitable for battery- or rechargeable battery-operated devices. Transfer occurs on 40 channels at 2.4 GHz in the ISM band. The channels are divided into advertising channels and data channels. The advertising channels are used to establish a BLE connection between two subscribers and to transmit broadcasts, while larger quantities of data are transferred via the data channels. In order to establish a connection, advertising packets are constantly being sent or constantly searched for, which results in comparatively high energy consumption.

Devices having BLE interfaces can be interconnected into piconets in which one subscriber, as master, is connected to one or more subscribers functioning as slaves. It is disadvantageous in this context that the master must possess greater resources. This refers to hardware but also to the energy supply for establishing and maintaining the connections to the piconet subscribers.

"Beacons" are small, usually battery- or rechargeable battery-operated electronic devices for transferring data, preferably using the Bluetooth LE standard. Beacons supplied with energy in other ways, for example beacons connected to the power grid, are nevertheless also known. Beacons can be designed for a variety of applications. They are used in sensors, for example temperature sensors, in order to transfer measurement signals, as signal transducers for localization functions (e.g. iBeacon of the Apple company), as transmitters of data, for example advertising, for directing large flows of visitors, for example in stadiums, for information transfer, e.g. in museums and exhibitions, and much more. The Bluetooth LE standard enables bidirectional data exchange in this context. It is disadvantageous that beacons usually possess only very small inventories of energy and other resources (transmission power, range, computing power, memory capacity, etc.). They are therefore not suitable as connection coordinators in a network.

An object of the invention is therefore to furnish a method that makes it possible to establish and maintain, on the basis of BLE connections, a network having subscribers with few energy resources.

A further object of the invention is to create a beacon that is suitable as a subscriber for such a network.

That object of the invention which relates to the method is achieved by the fact that clusters having one subscriber, or several subscribers connected by means of BLE network connections, are formed; that a unique cluster identifier (cluster ID) is allocated to each cluster; that a first subscriber of a first cluster selects a second subscriber, located within range of a BLE connection, from a second cluster that is smaller or of the same size, and causes it to be detached from the second cluster and integrated into the first cluster by way of a BLE network connection to the first subscriber. Thanks to the method it becomes possible to establish a mesh network without a centrally arranged connection coordinator. The network can thus be formed with subscribers that possess only very few resources. The method makes it possible in particular to establish a network with battery- or rechargeable battery-operated subscribers having little battery or rechargeable-battery capacity, and to operate it over long periods of time. Thanks to the method according to the present invention, smaller clusters become dissolved while larger clusters grow, until all the subscribers are connected in one cluster and thus in one network. Current implementations of a Bluetooth Low Energy standard permit only one input and several, for example three, outputs for the establishment of BLE connections (Bluetooth Low Energy standard 4.1, version 1.0). The limitation to one input is advantageous because a subscriber connected via the input, and thus operated as a slave, must conform to the connection parameters of the master connected to the input, which ultimately is efficiently possible only for one master. The method makes it possible to establish a BLE network connection between two subscribers whose inputs are already occupied. For this, the selected subscriber firstly severs its connections to its cluster and then connects itself to the subscriber that has selected it for establishment of a BLE network connection. Provision can advantageously be made that each cluster is uniquely characterized via a cluster identifier (cluster ID); and that a new BLE network connection can be established only between two subscribers of different clusters. Ring interconnections can thereby be avoided, and a simple tree structure is obtained for the resulting network. The cluster identifier of the subscriber that established the first BLE network connection of the existing cluster can preferably be used as a cluster identifier (cluster ID).

In accordance with a preferred variant embodiment of the invention, provision can be made that before a BLE network connection is established, identifier data ("join-me" packet) are delivered between subscribers of existing clusters; that the identifier data contain at least the subscriber identifier (node ID) and/or the number of unoccupied inputs and/or the number of unoccupied outputs of a respective subscriber, and/or the cluster identifier (cluster ID) and/or a cluster size of the cluster to which the respective subscriber belongs; that receiving subscribers determine, from the identifier data sent from various subscribers, an evaluation number (connection score) for each of those subscribers; and that a subscriber of a larger cluster selects, on the basis of the evaluation number (connection score), a subscriber of a smaller cluster for establishment of a BLE network connection; or that, for clusters of the same size, a subscriber is defined as a function of the respective cluster identifier (cluster ID) and/or the respective subscriber identifier (node ID) and selects, on the basis of the evaluation number (connection score), a second subscriber for establishing the network connection. The identifier data can be delivered by means of advertising packets provided in the context of Bluetooth Low Energy applications. The connection score can then be determined from the identifier data, for example by means of a function (cluster score function). The subscriber of the larger cluster is responsible for selecting the connection partner. With the aid of the connection score, the subscribers can select the most suitable connection partner and enter into a BLE network connection to it. If the two clusters are of the same size, provision can be made that a decision is made, based on the cluster identifier (cluster ID), as to which subscribers can decide regarding the establishment of a BLE network connection. A knowledge of the cluster size is essential for establishment of the network. That knowledge is preferably stored in each subscriber of a cluster. When a new subscriber is connected to the cluster, the cluster size can be incremented by one and the new cluster size can be transmitted to the other subscribers of the cluster. In accordance with a farther-reaching embodiment of the invention, provision can be made that the evaluation number (connection score) assumes a value that prevents a BLE network connection if the subscriber transmitting the identifier data (join-me packet) belongs to the same cluster as the subscriber that is receiving and evaluating the identifier data, and/or if the transmitting subscriber belongs to a larger cluster than the receiving and evaluating subscriber. Provision can correspondingly be made that the evaluation number (connection score) assumes a value that corresponds to a higher score for a possible BLE network connection if the transmitting subscriber has an unoccupied input and if the transmitting subscriber does not belong to the same cluster or to a larger cluster. A connection in which the selecting subscriber is connected as master, and the selected subscriber as slave, is then enabled. It is likewise possible take into consideration, in ascertaining the connection score, a signal strength of the signal received from a subscriber that is to be evaluated. This can occur, for example, in the form of a received signal strength index (RSSI). BLE network connections are then preferentially set up to subscribers from which a high signal strength is available. It is furthermore possible for a battery run time and/or the device type to be conveyed in the context of ascertaining the connection score, and to be used to determine the connection score. What can thereby be achieved is that connections are preferentially set up to subscribers that possess good battery resources and/or that belong to a specific device class.

Before a BLE network connection is established, subscribers must first recognize one another and evaluate a possible connection establishment. Provision can therefore be made that during a discovery phase of network establishment, the subscribers continuously transmit connection data having their identifier data (join-me packet) and receive connection data having identifier data from transmitting subscribers; that receiving subscribers store the respectively most recently received identifier data of the transmitting subscribers; and that the frequency with which connection data are sent out, and/or with which connection data for reception are searched for, is reduced or terminated if the received identifier data all have the same cluster identifier (cluster ID). The transmission of and scanning for data result in high energy consumption. It is necessary during the discovery phase to transmit and scan frequently, however, so that subscribers within range can quickly be detected and connections established. Once all the reachable subscribers have been connected, they all have the same cluster identifier (cluster ID). Advantageously, the frequency with which connection data are sent out, and connection data for reception are searched for, can be reduced. Energy can thereby be saved, and the operating time of battery- or rechargeable battery-operated subscribers can be appreciably extended. With a reduced frequency of transmission and reception, new subscribers can be found, if applicable with an accepted delay, and integrated into the network. Energy consumption can be further reduced if the transmission of and search for connection data is completely halted, but new subscribers cannot be recognized and accepted. According to a further embodiment of the invention, provision can be made that after an interruption of a BLE network connection has occurred, the frequency with which connection data are transmitted and received is increased again in order to enable reconnection to the lost subscriber.

According to a particularly preferred embodiment of the invention, provision can be made that at least one beacon is used as a subscriber. Beacons are small, usually battery- or rechargeable battery-operated and Bluetooth-capable, devices having a wide variety of possible applications, for example as sensors, as data transmitters for targeted advertising, for navigation, and much more. The mesh network that is formed is particularly suitable for this type of subscriber, which possesses only a low level of resources in terms of energy and hardware.

In order to allow the correct cluster size to be determined even in the event of an interruption of a BLE network connection, provision can be made in a further embodiment of the invention that for each input and output of a subscriber, the number of subscribers in a branch of the network that is connected to the respective input or output is stored by the subscriber ("connected cluster size"); that the counter ("cluster size") is reduced by an amount equal to the number of subscribers in the branch (connected cluster size) if a BLE network connection to the branch is interrupted; and that the new value of the counter (cluster size) is transmitted to the other subscribers of the cluster. Advantageously, in order to avoid concurrency problems, that new value can be transmitted as a change relative to the old value. Provision can furthermore advantageously be made that upon an interruption of a BLE network connection, a new cluster identifier (cluster ID) is allocated to the smaller cluster that has formed.

For initialization of the subscribers, provision can furthermore be made that during a first phase (node initialization) of network establishment, a subscriber not yet connected to a further subscriber has its subscriber identifier (node ID) assigned to it; that on the basis of that subscriber identifier (node ID) a cluster identifier (cluster ID) is generated and/or a cluster size of one is assigned to the unconnected subscriber; and/or that for the unconnected subscriber, the number of subscribers connected per input and per output (connected cluster size) is set to zero. All the information needed in order to connect to further subscribers is thus available to the subscribers at the beginning of network establishment.

In order to make it possible for several physically overlapping networks to be established in one physical space, provision can be made in a further embodiment of the invention that during the first phase (node initialization), a network identifier (network ID) is allocated to each network and is stored in the subscribers of the respective network which are already connected or are to be connected.

That object of the invention which relates to the beacon is achieved by the fact that the beacon is embodied to establish a network with the further subscribers by means of BLE network connections; and that the beacon is embodied to reduce the frequency with which connection data are sent out and/or searched for, or to halt the transmission of and/or search for connection data, when the subscribers present within range of a bidirectional BLE connection are integrated into the network. The energy consumption of the beacon can be appreciably decreased by reducing the frequency with which connection data are sent out or scanned for. It is thereby possible to establish networks, having at least one or preferably several beacons, which have a long operating time even if the beacon's energy resources are limited.

A mesh network can be established by the fact that the beacon is embodied to form, alone or together with at least one further subscriber connected via a BLE network connection, a first cluster; that the beacon is embodied to select a second subscriber from a second cluster that is smaller or of the same size and to cause it to interrupt its BLE network connections to subscribers of the second cluster; and that the beacon is designed to establish a BLE network connection to the second subscriber.

Provision can preferably be made that a unique subscriber identifier (node ID), and/or a unique cluster identifier (cluster ID), and/or a unique network identifier (network ID), and/or a cluster size of the cluster to which the beacon belongs, and/or the number of subscribers in a branch of the network which is connected to a respective input or output of the beacon (connected cluster size), is stored in the beacon. The data can thereby be used to establish and maintain the network.

According to a particularly preferred variant embodiment of the invention, provision can be made that the beacon is designed to deliver identifier data (join-me packet), as connection data or as a portion of the connection data, to further subscribers and to receive identifier data from them; and that the identifier data contain at least the subscriber identifier (node ID), and/or the number of unoccupied inputs and/or the number of unoccupied outputs of the beacon, and/or the cluster identifier (cluster ID), and/or the cluster size of the cluster to which the beacon or the further subscriber belongs. The data that are necessary for establishing a BLE network connection between two subscribers are thus available to potential subscribers of a network.

The beacon can preferably be designed to determine from the received identifier data (join-me packet), with the aid of a function (cluster score function) stored in the beacon, an evaluation number (connection score) for each of the subscribers whose identifier data have been received from the beacon; and the beacon can be designed to select, on the basis of the evaluation number, a subscriber for establishment of a BLE network connection. The beacon can thus quickly and easily decide as to the further subscriber, for example the further beacon, with which it preferentially wishes to establish a BLE network connection, and can then correspondingly set it up. Because the cluster identifier (cluster ID) is taken into consideration, it is possible to reliably prevent interconnection of subscribers of the same cluster. Multiple connections within one cluster and within one network can thereby be avoided. In accordance with a possible embodiment of the invention, provision can furthermore be made that in the context of selecting a subscriber for establishment of a BLE network connection, a signal strength of the received radio signal of the selected subscriber is taken into account. This can be done, for example, by taking into account a received signal strength index (RSSI). BLE network connections are then preferentially set up to subscribers from which a high signal strength is available.

The beacon can preferably be used to carry out the method described above.

Figure 2:
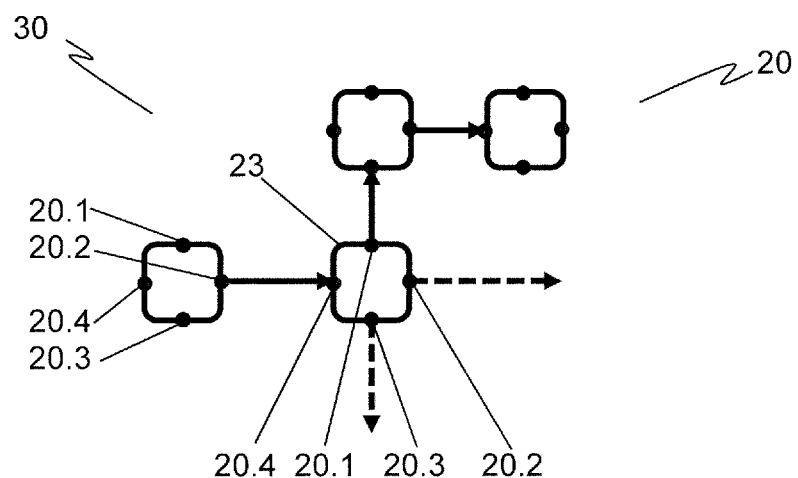
Figure 3:
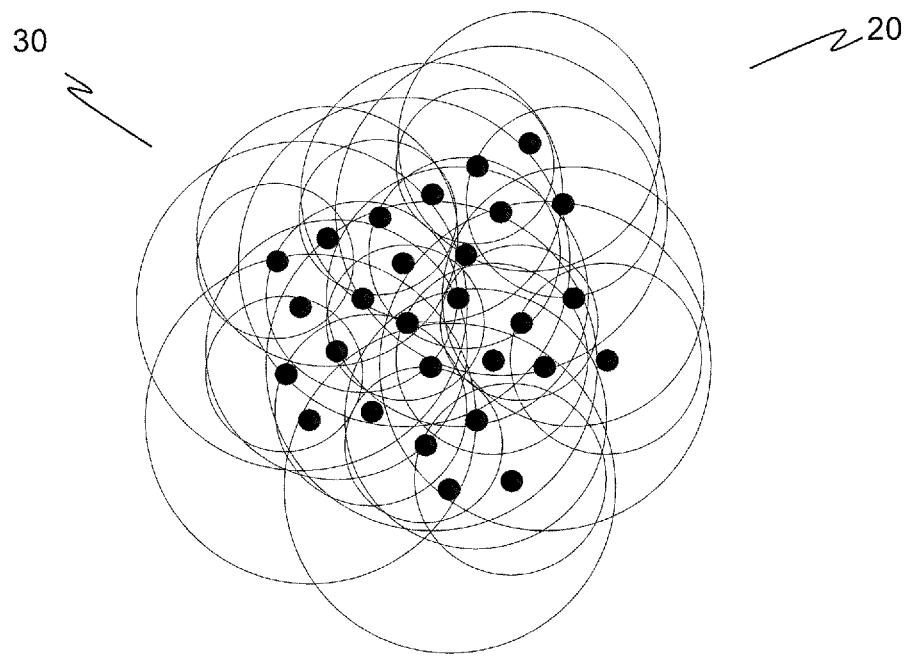
Figure 4:
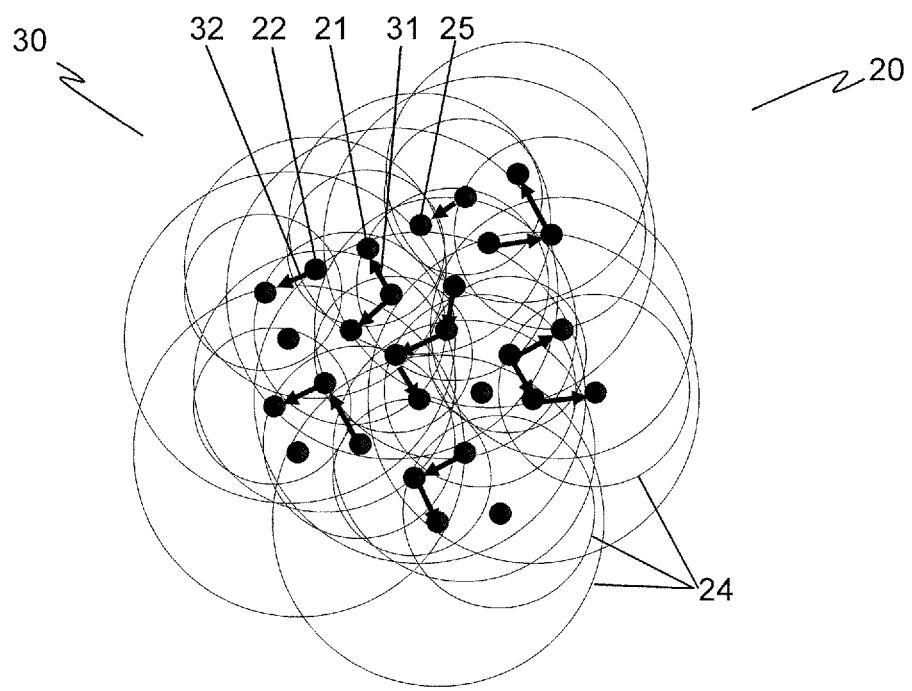
Figure 5:
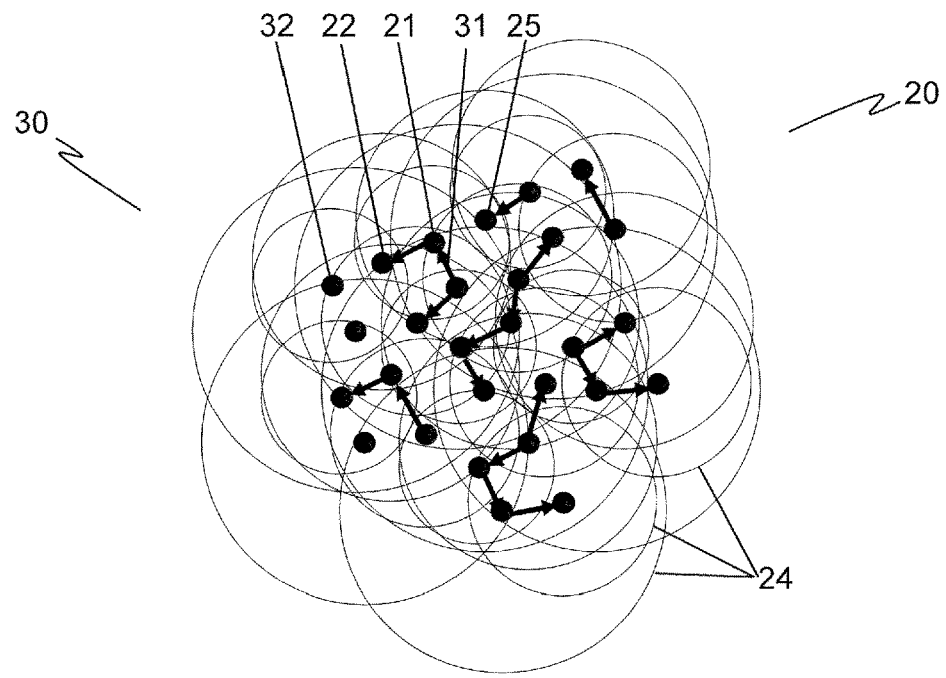
Figure 6:
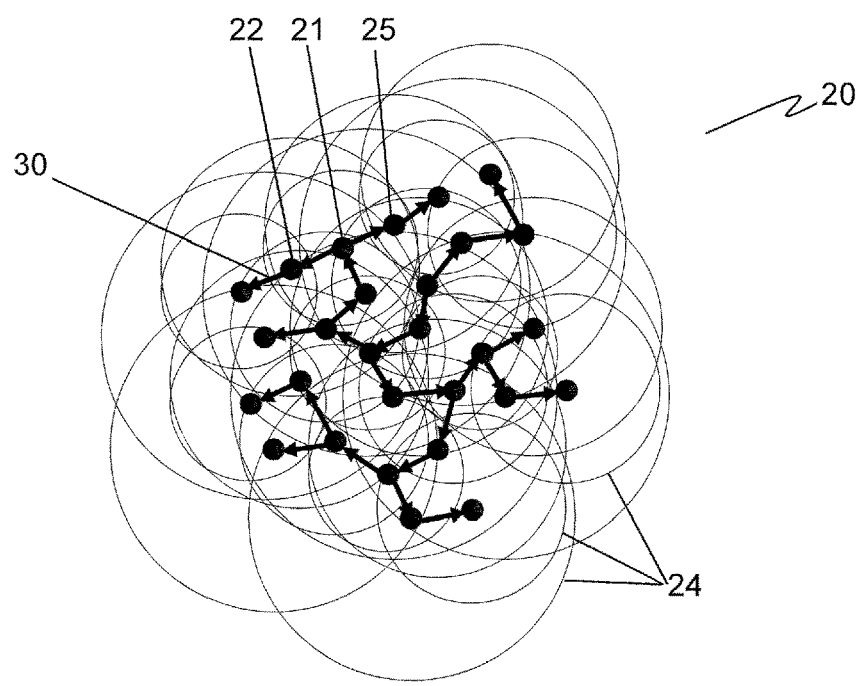
Figure 7:
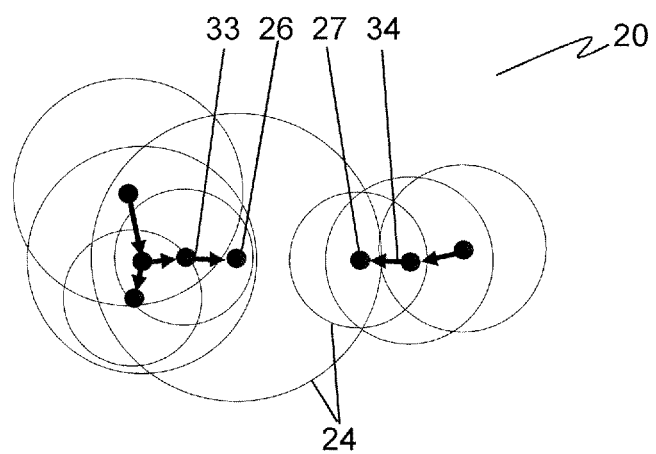

The invention will be described in further detail below with reference to an exemplifying embodiment depicted in the drawings, in which:

FIG. 1 is a flow chart for establishing a network;
FIG. 2 shows a cluster of a network;
FIG. 3 shows subscribers, not yet networked, of a network that is to be formed;
FIG. 4 shows the subscribers shown in FIG. 3, partly networked;
FIG. 5 shows the subscribers shown in FIG. 4, further networked;
FIG. 6 shows a network having the completely networked subscribers of FIG. 5; and
FIG. 7 shows two clusters of different sizes during establishment of a network.

FIG. 1 is a flow chart for establishment of a network. The flow chart provides, successively, for a node initialization phase 10, a discovery phase 11, a route setup phase 12, a route maintenance phase 13, and a routing phase 14. The network is established with subscribers 20 shown in FIGS. 2 to 7, on the basis of Bluetooth Low Energy (BLE) connections. Subscribers 20 can be identical or different electronic components. In the exemplifying embodiment shown, at least one of the subscribers is embodied as beacon 23 as shown in FIG. 2. The individual phases can be cycled through repeatedly, and also in different sequences.

During the node initialization phase 10, a unique subscriber identifier (node ID) and a network identifier (network ID) are assigned to subscribers 20 before they connect to the network. A key for encoding data is preferably also assigned to subscribers 20. The network identifier allows several physically overlapping networks to be operated. Based on the subscriber identifiers (node IDs), subscribers 20 generate cluster identifiers (cluster IDs). For each subscriber (20, 21, 22, 25, 26, 27), a cluster size is set to the initial value of one.

As shown in FIG. 2, with the Bluetooth LE implementation that is used, a subscriber 20 comprises three outputs 20.1, 20.2, 20.3 and one input 20.4. A value that indicates the number of subscribers 20 in a branch of the network which is connected to a respective input 20.4 or output 20.1, 20.2, 20.3 of subscriber 20 (connected cluster size) is set to zero for all inputs 20.4 and outputs 20.1, 20.2, 20.3 of subscribers 20. The initial values thereby constituted are stored in subscribers 20.

During the discovery phase 11, subscribers 20 successively send out broadcast messages in the form of advertising packets. Broadcast data are not addressed to one subscriber 20, but instead can be received by all subscribers 20 within range of the transmitter. The advertising packets contain connection data. Between transmissions, subscribers 20 scan the advertising channels, on which the broadcast messages are being transmitted, for connection data transmitted by other subscribers 20. The transmitted advertising packets convey identifier data (join-me packet) that describe properties of the transmitting subscriber 20. Those properties allow a receiving subscriber 20 to evaluate the transmitting subscriber 20 with regard to establishment of a BLE network connection.

The identifier data (join-me packet) preferably contain the node ID, the number of unoccupied inputs, and the number of unoccupied outputs of the transmitting subscriber, as well as the cluster identifier (cluster ID) and cluster size of a cluster 30, shown in FIGS. 2 to 7, to which the respective subscriber 20 belongs. The advertising packet signals a possible connection if an input of the transmitting subscriber is unoccupied. If the input is occupied, the advertising packet signals that a direct connection is not possible.

Received advertising packets having identifier data are stored by the respective subscriber 20 in a buffer. If identifier data are received repeatedly from a transmitting subscriber 20, older data are overwritten with the more recent data and preferably the reception time is also saved.

After a predefined duration of the discovery phase 11, in the route setup phase 12 the best connection partner is ascertained by the respective subscribers 20 based on the collected identifier data (join-me packets). For each of subscribers 20 whose identifier data are available, an evaluation number (connection score) is ascertained using a function (cluster score function). This evaluation number expresses the subscriber 20 to which a BLE network connection is preferentially to be established. The connection score contains a low value, preferably zero, if the transmitting subscriber 20 is integrated into the same cluster 30 as, or a larger one than, the receiving and evaluating subscriber 20. A BLE network connection to such a subscriber 20 then cannot be initiated by the evaluating subscriber 20. The decision as to establishing a connection is thus the responsibility of subscriber 20 of the larger cluster 30. If the two subscribers belong to different clusters 30 of the same size, a decision as to which subscriber 20 can decide regarding establishment of a connection is made based on the cluster identifier (cluster ID and/or the subscriber identifier (node ID).

Once all the identifier data have been evaluated, subscriber 20 attempts to create a BLE network connection to subscriber 20 having the highest connection score. For that purpose, a subscriber 20 will preferentially select a further subscriber 20 that has an unoccupied input 20.4, and attempt to connect to it as master.

During the handshake, the two relevant subscribers 20 exchange further data (cluster welcome packet) having their most recent, and therefore up-to-date, identifier data. If it is found in that context that the two subscribers 20 already belong to the same cluster 30, the connection that has just been established is interrupted again. It is thereby possible to prevent a subscriber 20 from being connected to the same cluster 30 via several connections. Otherwise, authorization is given for subscriber 20 of the smaller cluster 30 to interrupt all BLE network connections to the smaller cluster 30. A BLE network connection is then established between the selecting and selected subscribers 20. The new subscriber 20 stores its new cluster identifier and its new cluster size, which has been incremented by one as compared with the cluster size of the larger cluster 30. The accepted subscriber 20 then delivers a cluster ACK packet with which it acknowledges its entry into the new cluster 30. This is followed by a message (cluster update message) to the other subscribers of cluster 30, having the new cluster size. The change in cluster size is made incrementally. This is advantageous because at a specified point in time, for example while a further handshake is currently occurring, not all subscribers 20 of a cluster 30 have stored the same cluster size.

If a BLE network connection is interrupted, the cluster size is reduced by a value equal to the number of lost subscribers 20. This too is accomplished incrementally. It is necessary for this purpose for each subscriber 20 to store, for each input and output 20.1, 20.2, 20.3, 20.4, the number of subscribers 20 contained in the branch to which it is connected (connected cluster size). To avoid identical cluster identifiers (cluster IDs), a new cluster identifier (cluster ID) is generated for the smaller cluster 30 that has been formed, based on the subscriber identifier (node ID) of subscriber 20 whose connection was interrupted. The larger cluster 30 retains its cluster identifier.

Subscribers 20 of a larger cluster 30 can decide which connection to enter into. Smaller clusters 30 thereby become dissolved until only one cluster 30 exists. The result is that a mesh network forms with no need for a higher-order coordinator.

Once the network has formed, all the identifier data (join-me packets) have the same cluster identifiers (cluster IDs). Once this is the case, in the route maintenance phase 13 subscribers 20 are then switched over to a "slower discovery" mode; this is preferably done if no changes in the transmitted cluster identifiers occur over a longer period of time. During the slower discovery phase, the subscribers scan the network less frequently, and transmit fewer advertising packets, as compared with the previously described discovery phase 11. It is also conceivable to completely shut off the discovery of further subscribers 20. This has the disadvantage, however, that new subscribers 20 can no longer be discovered and integrated into the network. If the connection to a subscriber 20 becomes lost, its previous connection partner switches the network back into the discovery phase with the corresponding high transmission and search frequency. The network will thus reconnect subscribers 20 to which a connection was interrupted, alternative connection routes possibly being selected. The network is thus self-healing. The disconnected subscriber 20 is, with high probability, reconnected at the edge of the network. Subscribers 20 whose connection to the network is more frequently interrupted are thus shifted to the edge of the network, thereby enhancing the stability of the network.

During the routing phase 14, data can then be delivered via the network. As is known for mesh networks, the data can be forwarded from subscriber 20 to subscriber 20, and to the addressee. Possible messages are broadcast messages directed to all subscribers 20, or messages between two subscribers 20. Messages can also be transmitted to a connecting point (sink or gateway) integrated into the network and from there to another network, or messages can be received from the connecting point.

FIG. 2 shows a cluster 30 of a network having four subscribers 20. Each subscriber 20 comprises three outputs 20.1, 20.2, 20.3 and one input 20.4. The subscribers can thus enter into three connections as a master and one connection as a slave. One subscriber is embodied as beacon 23. Its input 20.4 is connected via a BLE network connection to a second output 20.2 of an upstream subscriber 20. A branch having two subscribers 20 is connected to first output 20.1 of beacon 23. Second and third outputs 20.2, 20.3 of beacon 23 are unoccupied and are not connected to a further subscriber 20.

Identifier data are assigned to beacon 23 and to the further subscribers 20 associated with cluster 30 that is shown. All these subscribers 20 connected in cluster 30 have the same network identifier (e.g. network ID=1), the same cluster identifier (e.g. cluster ID=7001), and the same cluster size; in the present exemplifying embodiment, cluster size=4. In addition, a dedicated subscriber identifier is assigned to each subscriber 20; for beacon 23, for example, node ID=7. Also stored in each subscriber 20, for each input and output 20.1, 20.2, 20.3, 20.4, is the number of subscribers 20 connected thereto (connected cluster size). In the example depicted, a connected cluster size of 1 is obtained for input 20.4 of beacon 23. A connected cluster size of 2 is allocated to first output 20.1 of beacon 23, while a connected cluster size of 0 is assigned respectively to second and third outputs 20.2, 20.3 of beacon 23. If the BLE network connection between first output 20.1 of beacon 23 and the following subscriber 20 is interrupted, the cluster size of the remaining cluster 30 is incrementally reduced in accordance with the connected cluster size of 2 associated with the first output. The new cluster size is then equal to 2.

FIG. 3 shows subscribers 20, not yet interconnected, of a network that is to be formed. A range 24 of its Bluetooth transmission module is associated with the respective individual subscribers 20 in the form of exemplifying concentric circles. Ranges 24 differ depending on the respective subscriber 20, and if applicable on the charge state of its energy supply. A subscriber identifier (node ID), a network identifier (network ID), and a cluster identifier (cluster ID) are allocated to each subscriber 20.

Subscribers 20 are in the discovery phase 11. Subscribers 20 accordingly transmit identifier data (join-me packet) very frequently. Between transmissions of the data, they receive identifier data from subscribers 20 within whose range 24 they are located.

At least a majority of subscribers 20 are embodied as beacons 23.

FIG. 4 shows subscribers 20 shown in FIG. 3 which are partly interconnected. Some subscribers 20 have connected via BLE network connections into clusters 30 having a cluster size greater than 1. A cluster A 31 and a cluster B 32 are labeled by way of example. Cluster A 31, having three connected subscribers 20, is larger than cluster B 32 having only two subscribers 20. A subscriber A 21 is arranged at the end of cluster A 31, while a subscriber B 22 is connected at the end of cluster B 32. A further adjacent subscriber C 25 is additionally marked. Subscribers A 21 and B 22 are each within range 24 of the other subscribers A, B, 21, 22. Based on the exchanged identifier data (join-me packet), both subscribers A, B, 21, 22 have the information that cluster A 31 is larger than cluster B 32. Subscriber A 21 can thus decide whether subscriber B 22 should detach itself from cluster B 32 and enter into a BLE network connection to subscriber A 21. The same applies to a possible BLE network connection between subscriber A 21 and subscriber C 25. The decision as to whether a connection is to be created, and with which of the two subscribers A, C, 22, 25, is made by subscriber A 21 on the basis of the evaluation number (connection score) that it has ascertained, with the aid of a stored function (cluster score function), from the identifier data conveyed from subscribers B, C, 22, 25. Because subscriber B 22 has one free input 20.4, a comparatively high connection score is determined; it is higher than the connection score of the adjacent subscriber C 25, since the latter's input 20.4 is occupied. Subscriber A 21 will therefore preferentially enter into a BLE network connection to subscriber B 22. The signal strength of a signal received from a transmitting subscriber 20 can also be taken in account in deciding the subscriber 20 with which a BLE network connection is to be entered into. Provision can be made, for example, that connections are preferentially established with subscribers 20 from which a strong transmitted signal is available. The strength of a transmitted signal can be taken into account, for example, in the form of a received signal strength index (RSSI).

FIG. 5 shows subscribers 20 shown in FIG. 4 which have been further interconnected. Proceeding from FIG. 4, subscriber A 21 has decided to establish a BLE network connection to subscriber B 22. For this, firstly the BLE network connection of subscriber B 22 to cluster B 32 was severed. A BLE network connection was then established between an output 20.1, 20.2, 20.3 (see FIG. 2) of subscriber A 21 and input 20.4 of subscriber B 22.

Because input 20.4 of subscriber B 22 was unoccupied before the connection was established, it is alternatively also possible for subscriber A 21 not to detach subscriber B 22 from cluster B 32 before establishment of the connection. Instead, subscriber A 21 can directly establish with subscriber B 22 a connection in which subscriber A 22 is configured as master, and subscriber B 22 as slave. The entire smaller cluster B 32 can thereby be coupled to the larger cluster A 31.

FIG. 6 shows a network having the completely interconnected subscribers 20 of FIG. 5. For this, subscriber A 21 has entered into a BLE network connection to subscriber C 25. Before establishment of the connection, input 20.4 of subscriber C 25 was occupied. Subscriber C 25 was therefore firstly detached from its original cluster 30 and then connected to subscriber A 21. The method thus makes it possible for subscribers 20 whose inputs 20.4 are already occupied to be capable of being shifted from smaller into larger clusters 30.

According to FIG. 6, all subscribers 20 belong to one cluster 30 and therefore have the same cluster identifier (cluster ID). Subscribers 20 thereupon switch to a mode (slower discovery mode) in which advertising packets are less often transmitted and searched for. The energy consumption of subscribers 20 can thereby be appreciably reduced.

The mesh network that has been formed does not require a coordinator or central master, but instead can be built up from identical subscribers 20. It is thus possible, for example, to establish a network having a plurality of subscribers 20 having little battery capacity or rechargeable-battery capacity, for example beacons. They interconnect with one another automatically. Connection between subscribers 20 is effected using a Bluetooth Low Energy standard, preferably in accordance with the Bluetooth 4.1 specification. Subscribers 20 are programmed with a corresponding application software in order to achieve networking capability. That software controls the above-described phases of connection establishment and network maintenance.

FIG. 7 shows two clusters D, E, 33, 34 of different sizes during establishment of a network. Cluster D 33 has four subscribers 20, and cluster E 34 has three. An end-located subscriber E 27 of the smaller cluster E 34 is located within range 24 of an end-located subscriber D 26 of the larger cluster D 33. Conversely, range 24 of subscriber E 27 of the smaller cluster E 34 does not reach subscriber D 26 of the larger cluster D 33. In both end-located subscribers D, E, 26, 27, input 20.4 is occupied. In such a case the possibility exists for subscriber D 26 of the larger cluster D 33 to detach subscriber E 27 of the smaller cluster E 34 from its cluster E 34 but with no possibility for a BLE network connection then to be established between the two subscribers 20, since the range of subscriber E 27 is too short for that purpose. The result is then that subscriber E 27 having the short range 24 is constantly unconnected and is searching for connection possibilities. The state of a low search and transmission frequency therefore also cannot be achieved for the neighboring subscribers 20, resulting in high energy consumption.

To prevent this, provision is preferably made to add to the identifier data (join-me packet) an ACK field that contains the subscriber identifier (node ID). Subscriber 26 can assign to this ACK field the subscriber identifier of subscriber E 27. That identifier is known to subscriber D 26 only if it has previously received identifier data (join-me packet) from subscriber E 27 and is thus within range 24 of subscriber E 27. A subscriber 20 is therefore detached from a further subscriber 20 of a cluster 30 only if both subscribers 20 are located within range 24 of the other subscriber 20.

The invention claimed is:

1. A method for establishing and maintaining a network having two or more subscribers (20, 21, 22, 25, 26, 27), based on radio connections between the subscribers (20, 21, 22, 25, 26, 27) in accordance with a Bluetooth Low Energy (BLE) standard, each subscriber (20, 21, 22, 25, 26, 27) being uniquely characterized by way of a subscriber identifier (node ID),
   wherein clusters (30, 31, 32, 33, 34) having one subscriber (20, 21, 22, 25, 26, 27), or several subscribers (20, 21, 22, 25, 26, 27) connected by BLE network connections, are formed;
   a unique cluster identifier (cluster ID) is allocated to each cluster (30, 31, 32, 33, 34);
   before a BLE network connection is established, each of the subscribers (20, 21, 22, 25, 26, 27) continuously broadcasts identifier data containing the respective cluster IDs and cluster sizes of the broadcasting subscribers (20, 21, 22, 25, 26, 27) and receives identifier data from broadcasting subscribers (20, 21, 22, 25, 26, 27) within range of a BLE connection, the identifier data containing the respective cluster IDs and cluster sizes of the broadcasting subscribers (20, 21, 22, 25, 26, 27);
   for establishing a BLE network connection, a first subscriber (20, 21, 22, 25, 26, 27) of a first cluster (30, 31, 32, 33, 34) with a first cluster ID selects a second subscriber (20, 21, 22, 25, 26, 27), located within range of a BLE connection, from a second cluster (30, 31, 32, 33, 34) with a second cluster ID, the second cluster (30, 31, 32, 33, 34) being of smaller or the same cluster size as the first cluster (30, 31, 32, 33, 34), and
   wherein the selection of the second subscriber (20, 21, 22, 25, 26, 27) by the first subscriber (20, 21, 22, 25, 26, 27) automatically causes the second subscriber (20, 21, 22, 25, 26, 27) to be detached from the second cluster (30, 31, 32, 33, 34) and integrated into the first cluster (30, 31, 32, 33, 34) by way of a BLE network connection to the first subscriber (20, 21, 22, 25, 26, 27).

2. The method according to claim 1, wherein before a BLE network connection is established, identifier data ("join-me" packet) are delivered between subscribers (20, 21, 22, 25, 26, 27) of existing clusters (30, 31, 32, 33, 34);
   the ID data contain at least the subscriber identifier (node ID) and/or the number of unoccupied outputs (20.1, 20.2, 20.3) and/or the number of unoccupied inputs (20.4) of a respective subscriber, and/or the cluster identifier (cluster ID) and/or a cluster size of the cluster to which the respective subscriber (20, 21, 22, 25, 26, 27) belongs;
   receiving subscribers (20, 21, 22, 25, 26, 27) determine, from the identifier data sent from various subscribers (20, 21, 22, 25, 26, 27), an evaluation number (connection score) for each of those subscribers (20, 21, 22, 25, 26, 27); and
   a subscriber (20, 21, 22, 25, 26, 27) of a larger cluster (30, 31, 32, 33, 34) selects, on the basis of the evaluation number (connection score), a subscriber (20, 21, 22, 25, 26, 27) of a smaller cluster (30, 31, 32, 33, 34) for establishment of a BLE network connection;
   or, for clusters of the same size, a subscriber (20, 21, 22, 25, 26, 27) is defined as a function of the respective cluster identifier (cluster ID) and/or the respective subscriber identifier (node ID) and selects, on the basis of the evaluation number (connection score), a second subscriber (20, 21, 22, 25, 26, 27) for establishing the network connection.

3. The method according to claim 2, wherein during a discovery phase of network establishment, the subscribers (20, 21, 22, 25, 26, 27) continuously transmit connection data having their identifier data (join-me packet) and receive connection data having identifier data from transmitting subscribers (20, 21, 22, 25, 26, 27);
   receiving subscribers (20, 21, 22, 25, 26, 27) store the respectively most recently received identifier data of the transmitting subscribers (20, 21, 22, 25, 26, 27); and
   the frequency with which connection data are sent out, and/or with which connection data for reception are searched for, is reduced or terminated if the received identifier data all have the same cluster ID.

4. The method according to claim 1, wherein at least one beacon (23) is used as a subscriber (20, 21, 22, 25, 26, 27).

5. The method according to claim 1, wherein each of the clusters (30, 31, 32, 33, 34) have several subscribers (20, 21, 22, 25, 26, 27) connected by BLE network connections.

6. The method according to claim 1, wherein:
   each of the subscribers (20, 21, 22, 25, 26, 27) have one or more outputs and one input;
   if the second subscriber's input is connected to the second cluster, the selection of the second subscriber by the first subscriber causes the second subscriber to sever a connection between the second subscriber's input and the second cluster, and to establish a BLE network connection between the second subscriber's input and an output of the first subscriber; and
   if the second subscriber's input is not occupied but at least one of the second subscriber's one or more outputs are connected to the second cluster, the selection of the second subscriber by the first subscriber causes the second subscriber to establish a BLE network connection between the second subscriber's input and an output of the first subscriber, and further integrate each subscriber in the first cluster with each subscriber in the second cluster via the at least one of the second subscriber's one or more outputs.

7. The method according to claim 3, wherein:
   during the discovery phase of network establishment, the subscribers continuously broadcast the connection data until all subscribers within range of a BLE network connection of each other are in the same cluster, upon which the transmission of connection data is at least delayed; and
   upon an interruption of the BLE network connection between at least two subscribers in the same cluster, reinstituting the continuous broadcasting of the connection data to enable reconnection of disconnected subscribers and identification of new subscribers.

8. The method according to claim 3, wherein:
   upon the second subscriber being integrated into the first cluster, and one or more subscribers remaining in the second cluster, a new cluster ID is generated for the second cluster and assigned to each subscriber remaining in the second cluster, and the cluster ID for the first cluster is assigned to the second subscriber.

9. A battery- or rechargeable battery-operated beacon, having a microprocessor and a radio interface, the radio interface being designed to establish, in accordance with a Bluetooth Low Energy (BLE) standard, a data connection to a further subscriber (20, 21, 22, 25, 26, 27) having such an interface,
   the beacon (23) being designed in a first mode of operation to continuously broadcast connection data and to search for transmitted connection data of further subscribers (20, 21, 22, 25, 26, 27), wherein the beacon (23) is embodied to establish a network with the further subscribers (20, 21, 22, 25, 26, 27) by BLE network connections; and the beacon (23) is embodied, in a second mode of operation to reduce the frequency with which connection data are sent out and/or searched for, or to halt the transmission of and/or search for connection data, when all of the subscribers (20, 21, 22, 25, 26, 27) present within range (24) of a bidirectional BLE connection to any one or more of each other are integrated into the network, wherein the beacon (23) is further embodied:

to form, alone or together with at least one further subscriber (20, 21, 22, 25, 26, 27) connected via a BLE network connection, a first cluster (30, 31, 32, 33, 34), to select a second subscriber (20, 21, 22, 25, 26, 27) from a second cluster (30, 31, 32, 33, 34) that is smaller or of the same size and to cause it to interrupt its BLE network connections to subscribers (20, 21, 22, 25, 26, 27) of the second cluster (30, 31, 32, 33, 34), and to establish a BLE network connection to the second subscriber (20, 21, 22, 25, 26, 27);

wherein a unique node ID, and/or a unique cluster identifier (cluster ID), and/or a unique network identifier (network ID), and/or a cluster size of the cluster to which the beacon (23) belongs, and/or the number of subscribers (20, 21, 22, 25, 26, 27) in a branch of the network which is connected to a respective input (20.1, 20.2, 20.3) or output (20.4) of the beacon (23) (connected cluster size), is stored in the beacon (23); and wherein upon the second subscriber being integrated into the first cluster, and one or more subscribers remaining in the second cluster, a new cluster ID is generated for the second cluster and assigned to each subscriber remaining in the second cluster, and the cluster ID for the first cluster is assigned to the second subscriber.

10. The beacon (23) according to claim 9, wherein the beacon (23) is designed to deliver identifier data (join-me packet), as connection data or as a portion of the connection data, to further subscribers (20, 21, 22, 25, 26, 27) and to receive identifier data from them; and the identifier data contain at least the node ID, and/or the number of unoccupied inputs (20.1, 20.2, 20.3) and/or the number of unoccupied outputs (20.4) of the beacon (23), and/or the cluster identifier (cluster ID), and/or the cluster size of the cluster to which the beacon (23) or the further subscriber (20, 21, 22, 25, 26, 27) belongs.

11. The beacon (23) according to claim 10, wherein the beacon (23) is designed to determine from the received identifier data (join-me packet), with the aid of a function (cluster score function) stored in the beacon (23), an evaluation number (connection score) for each of the subscribers whose identifier data have been received from the beacon (23); and the beacon (23) is designed to select, on the basis of the connection score, a subscriber (20, 21, 22, 25, 26, 27) for establishment of a BLE network connection.

12. The beacon according to claim 9, wherein upon an interruption of the bidirectional BLE connection between at least two subscribers in the network, the beacon is embodied to reinstitute the first mode of operation for continuously sending out connection data and searching for transmitted connection data of further subscribers.

* * * * *